United States Patent
Oosterkamp

(10) Patent No.: US 7,479,340 B2
(45) Date of Patent: Jan. 20, 2009

(54) METHOD FOR THE PRODUCTION OF ELECTROCHEMICAL CELLS AND AN ELECTROCHEMICAL CELL STACK

(75) Inventor: Willem Jan Oosterkamp, Oosterbeek (NL)

(73) Assignee: Oosterkamp Oosterbeek Octrooien, Oosterbeek (NL)

( * ) Notice: Subject to any disclaimer, the term of this patent is extended or adjusted under 35 U.S.C. 154(b) by 348 days.

(21) Appl. No.: 11/139,305

(22) Filed: May 27, 2005

(65) Prior Publication Data
US 2005/0287408 A1 Dec. 29, 2005

(30) Foreign Application Priority Data
May 27, 2004 (NL) .................................... 1026285

(51) Int. Cl.
*H01M 8/10* (2006.01)
(52) U.S. Cl. ................ 429/33; 429/31; 429/32
(58) Field of Classification Search .................. 429/31, 429/32, 33; 29/623.5
See application file for complete search history.

(56) References Cited
U.S. PATENT DOCUMENTS

| | | | |
|---|---|---|---|
| 3,402,230 A | 9/1968 | White, Jr. | |
| 5,338,623 A * | 8/1994 | Nachlas et al. | 429/31 |
| 6,060,188 A | 5/2000 | Muthuswamy et al. | |
| 6,294,128 B1 | 9/2001 | Crosbie | |

FOREIGN PATENT DOCUMENTS

| | | |
|---|---|---|
| EP | 1313162 | 5/2003 |
| FR | 1585403 | 1/1970 |
| JP | 10223239 | 8/1998 |
| JP | 2003338297 | 11/2003 |

* cited by examiner

*Primary Examiner*—Patrick Ryan
*Assistant Examiner*—Thomas H. Parsons
(74) *Attorney, Agent, or Firm*—The Webb Law Firm

(57) ABSTRACT

A method for the production of an electrochemical cell and an electrochemical cell stack is disclosed with annular electrolyte arranged in a pressure vessel. Such a cell is produced by providing an annular precursor already provided with the electrodes where the product is converted to the desired membrane/electrolyte by heating and oxidation. By using a pressure vessel, pressure can also be generated during the conversion. To this end the region outside the cell is provided with a fill material. A number of cells can be stacked on top of one another. With this arrangement, the anode of one cell can act as cathode of another cell by means of a Z-shaped configuration. Adjacent anodes/cathodes can be applied to one another by welding or can be of a Z-shaped design.

4 Claims, 2 Drawing Sheets

METHOD FOR THE PRODUCTION OF ELECTROCHEMICAL CELLS AND AN ELECTROCHEMICAL CELL STACK

CROSS REFERENCE TO RELATED APPLICATION

This application corresponds to Netherlands Application No. 1026285, filed May 27, 2004, which is herein incorporated by reference in its entirety.

BACKGROUND OF THE INVENTION

1. Field of the Invention

The invention relates to a method for the production of electrochemical cells and an electrochemical cell stack.

2. Description of Related Art

The invention relates to a method for the production of a stack of electrochemical cells, comprising the provision of an annular precursor of a membrane, applying a metallic electrode to the inside and outside of said ring and converting the annular precursor to a membrane/electrolyte.

The development of electrochemical cells and more particularly fuel cells is progressing increasingly further. Theoretical concepts are being translated into practical effective cells. In this context it is found that constructional problems arise as a result of the characteristics of electrochemical cells. After all, electrochemical cells are able to produce an appreciable current but the associated voltage is relatively low. The materials used are all of limited conductivity so that if the current in the electrochemical cell stack becomes too high the resistance losses will be appreciable, as a result of which the output of a cell decreases. The aim is therefore to connect electrochemical cells in series as far as possible. However, such connection in series must be achieved in a compact space.

The production of the electrochemical cells constitutes another problem. These must preferably be able to be produced as easily as possible in order to make the cell competitive compared with existing electricity generators.

JP 2003338297 discloses the production of an electrochemical cell using an auxiliary tube. Furthermore, in this publication state of the art is described where such an auxiliary tube is not present but the electrolyte acts as support.

A cell stack in a pressure vessel is described in European application 1 313 162 A2 Also, an example of a construction having a heating element is described in the same application EP 1 313 162 A.

SUMMARY OF THE INVENTION

The aim of the present invention is to provide a method by means of which it is possible in a simple manner to produce a cell stack or other construction. This aim is realised in a method for the production of a stack of electrochemical cells wherein said conversion is carried out in situ under pressure, said cell stack being surrounded by a fill material. As a result of the use of an annular membrane/electrolyte support an electrochemical cell, and more particularly a fuel cell, can be produced in a particularly compact volume. Production is possible in a simple manner in that the anode and cathode are applied to the annular precursor, after which the annular precursor undergoes conversion, for example by increasing the pressure and optionally the temperature and/or oxidant, to give the membrane/electrolyte support. A material that is particularly suitable for this is zirconium that is converted in the presence of oxygen to zirconium oxide. This is optionally stabilised with yttrium or other stabilisers. The electrodes can, in particular, be applied as a thin layer to the zirconium ring acting as electrode support. In this case platinum can be used for one or both electrodes. This can be applied in a thickness of a few µm.

According to the present invention the cell stack can be produced by stacking a number of rings obtained in this way on top of one another, the anode of one cell always serving as the cathode of the following cell. As a result connection in series can be obtained particularly easily by stacking a number of rings on top of one another. Such a construction can be placed in a pressure vessel particularly efficiently. The gap between the walls of the pressure vessel and the interior space of the cell is filled with a fill material. The porosity of this fill material can be dependent on the position thereof in the pressure vessel. Preferably the porosity close to the electrode is high in order not to impede gas transport. Likewise the specific size of the particles can be changed depending on the distance from the membrane. Close to the membrane the "grain size" will be relatively small in order to support the vulnerable membrane as effectively as possible. Somewhat further away the fill material used can have a larger specific diameter. It must be understood that the fill material does not necessarily have to be spherical. As indicated, the anode of one cell and the cathode of a following cell are coupled to one another. This can be effected by welding, by constructing as a continuous strip of material or by placing the electrodes concerned in contact with one another. An internal heating element can optionally be present. This can be constructed in any manner conceivable in the state of the art.

According to an advantageous embodiment of the invention in the case of connection of a number of fuel cells in series/parallel, one of said fuel cells is replaced by such a heating element. Another option is that a cell that has not yet been oxidised functions itself as internal heating element. As long as it has not yet been oxidised, it has conducting properties.

BRIEF DESCRIPTION OF THE DRAWNGS

The present invention will be explained in more detail below with reference to illustrative embodiments shown in the drawings.

DETAILED DESCRIPTION OF THE INVENTION

Figure 1:
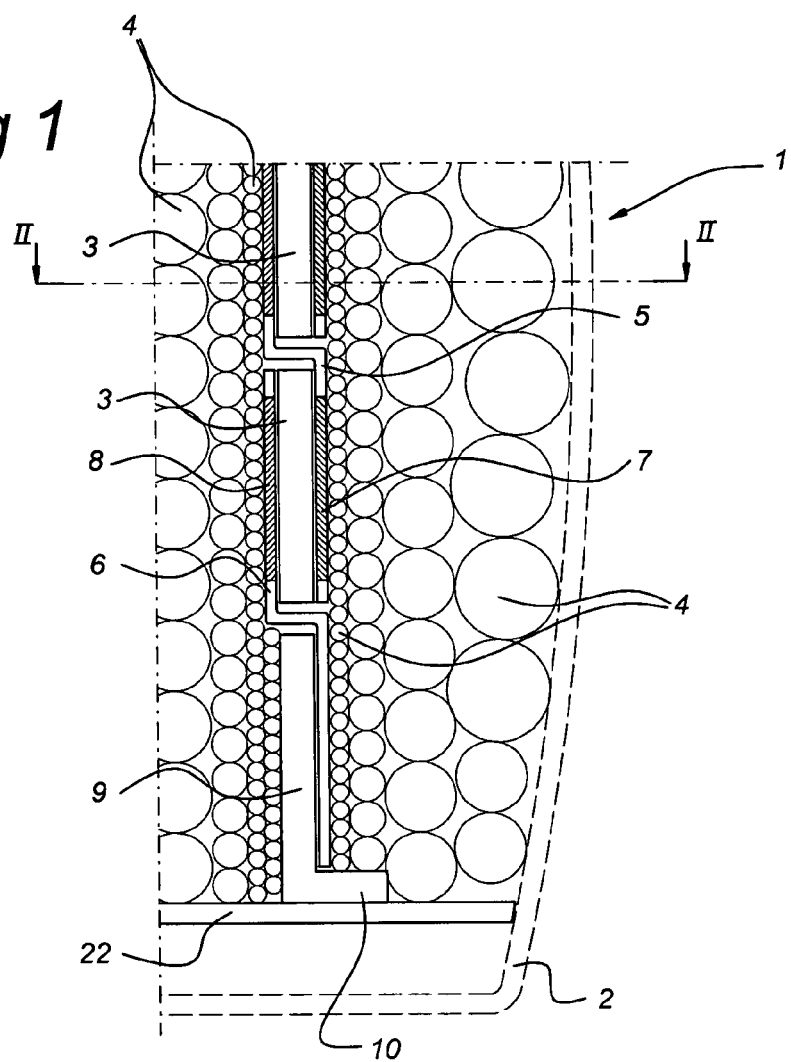
FIG. 1 shows a first embodiment of an electrochemical cell according to the present invention.
Figure 2:
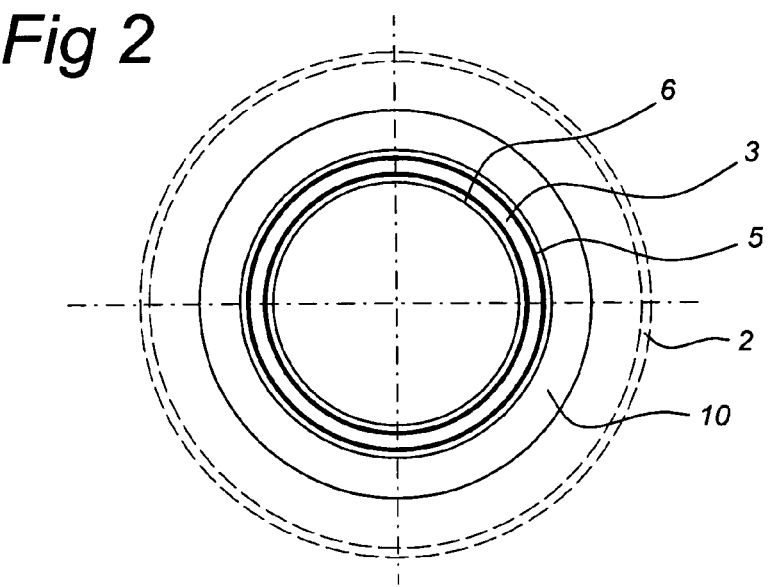
FIG. 2 shows the electrochemical cell according to FIG. 1 in cross-section along line II-II.

In FIG. 1 an electrochemical cell is indicated by 1. This is accommodated in a pressure vessel 2 shown by a broken line. The electrochemical cell consists of an annular membrane 3 of zirconium oxide. Yttrium (5-10%) can be added to zirconium for the stabilisation thereof (YSZ). It can be seen from FIG. 2 that the membrane is annular. A cathode 5 and an anode 6 are placed against the annular membrane 3. The remaining space in the pressure vessel 2 is filled with a fill 4. It can be seen that the fill has a larger specific diameter or size further away from the membrane 3. Only restricted regions of the cathode 5 and anode 6 are electrically conducting and permeable to gas. The porous active region of the cathode 5 is hatched and indicated by 7, whilst the active porous region of the anode is indicated by 8 and is likewise hatched.

A further cell is arranged diagrammatically above cell 1. It can be seen that in the following cell the cathode 5 acts as anode. As a result a single metallic component can act both as anode and cathode. Consequently the connection of a number of cells in series in the pressure vessel 2 is easy to achieve. The annular precursor of the membrane 3 subsequently obtained, which acts as electrolyte support, is obtained by producing this in situ. The starting material is a non-oxidised or partially oxidised material such as zirconium and the desired zirconium oxide membrane is produced by raising the temperature with the addition of oxygen. The electrodes described above are already present.

An internal heating element can optionally be present for starting up the process and optionally maintaining the desired temperature. A temperature of approximately 1200° C. is preferred for the process. The "final" membrane in a series is indicated by 9 in FIG. 1. This is provided with flanged piece 10 that seals against an end plate 22. Sealing is provided in this location. Gas is fed both centrally and into the region located outside the ring 9 via the end plate 22.

The expansion produced by heating is taken up by the pressure vessel. That is to say during operating temperature the cell and the cell stack consisting of a number of cells are accommodated at an appreciable pressure in pressure vessel 2.

The active regions of the electrode are shown as continuous lines in FIG. 1. Of course, openings are made therein in some way or other for the passage of reactant such as fuel gas and air/oxygen. The gases concerned are directed through the fill. With this arrangement the fuel gas, such as methane, is supplied centrally. With this arrangement it is possible to vary the porosity of the fill depending on the position in the pressure vessel.

The various features are so designed that the fill material has a smaller average diameter the closer it comes to the membrane 3. The membrane is better supported as a result. The porosity can likewise be varied in order to optimise the feed and discharge of the reactants. The porosity is lower a greater distance away from the membrane and more support is provided.

The path along which the gases move can be any conceivable path but is preferably in counter-current. With this arrangement the cold reactant on one side is heated by the warmer reactant on the other side. The temperature of the membrane 3 can be influenced by changing the thermal conductivity characteristics of the fill material. Preferably this is such that the temperature thereof is as high as possible. The conductivity can be optimised by adding metallic components to the fill material. The same applies by use of fill material with different porosity and different size. The thickness of the anode/cathode is shown exaggerated in the drawing. In practice a thickness of a few µm can suffice. Consequently it is possible to use relatively expensive materials, for example metals based on the platinum series, for the anode and cathode.

Using the present invention it is possible to place a large number of membrane rings 3, 9 in a pressure vessel. A number of 100 is mentioned as an example. By always connecting these in series, the passage of current can be restricted while a high voltage can be achieved.

Figure 3:
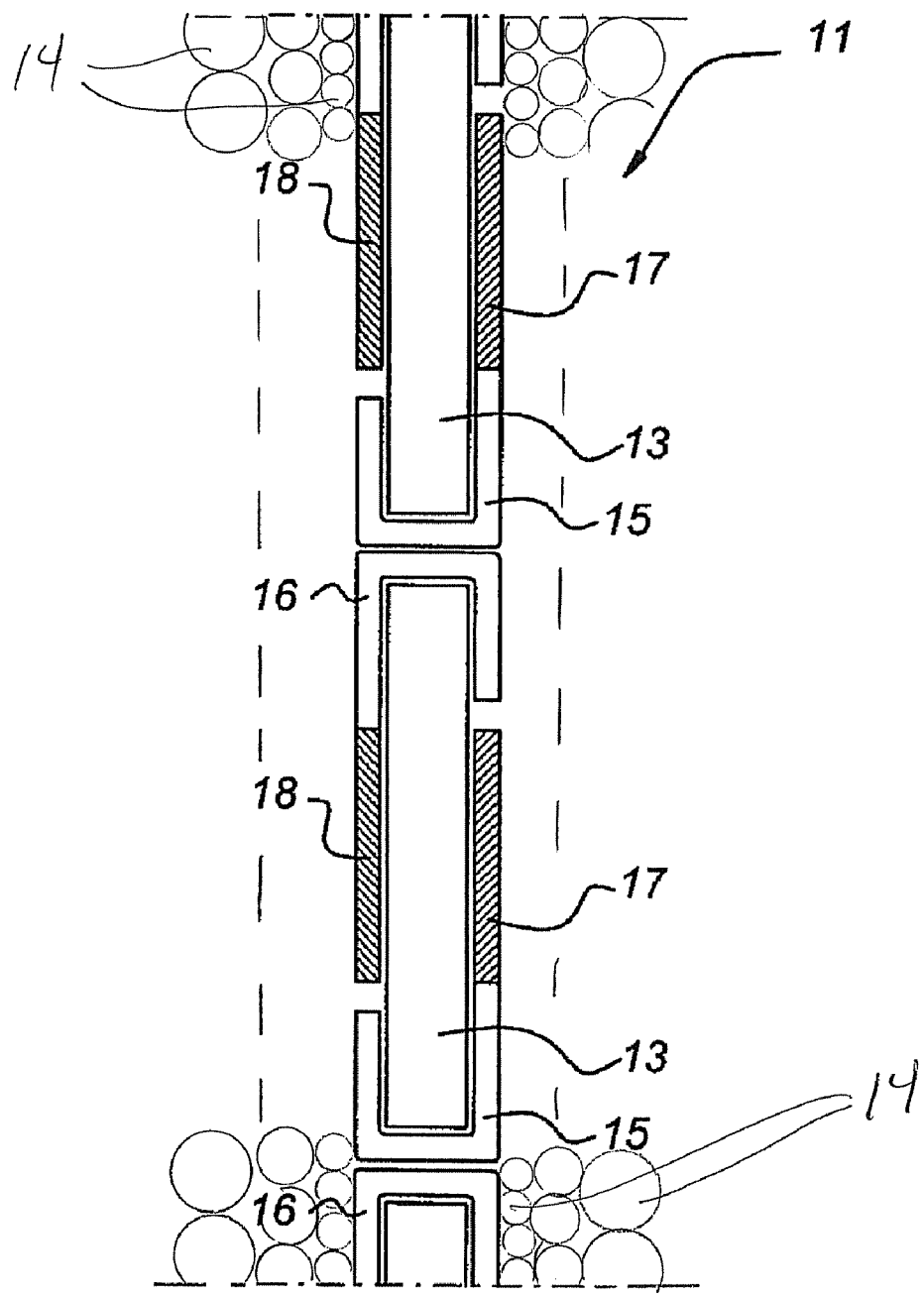
FIG. 3 shows a further embodiment of an electrochemical cell according to the present invention.

A variant of the present invention is shown in FIG. 3. A cell is indicated in its entirety by 11 and the membrane concerned by 13. The fill is indicated by 14, whilst the cathode is indicated by 15 and the anode by 16. The active region of the cathode has reference numeral 17, whilst the porous region of the anode has reference numeral 18. It can be seen from this figure that there is no longer a continuous Z-shaped configuration but that the anode of the bottom cell is in contact with the cathode of the cell located above it.

By means of the present invention it is possible to achieve a series connection by placing a number of rings with the same dimensions one after the other along the axis thereof, with anode/cathode placed between them. The various aspects can be implemented particularly easily by converting green rings into membrane/electrolyte support in situ.

After reading the above, variants which are obvious and fall within the scope of the appended claims will be immediately apparent to those skilled in the art.

The invention claimed is:

1. A stack of electrochemical cells comprising a plurality of cells wherein each cell comprises:
    an annular porous platinum anode;
    an annular porous platinum cathode; and
    a precursor to an annular membrane disposed between said anode and said cathode, said precursor consisting of zirconium metal alloy, wherein:
    an anode of a cell in said plurality of cells is directly connected to a cathode of an adjacent cell in said plurality of cells; and
    said stack includes an internal heating element.

2. The stack according to claim 1, wherein said direct connection comprises a cross member disposed between adjacent cells in the stack.

3. The stack according to claim 1, wherein said direct connection comprises welding.

4. The stack according to claim 1, wherein said zirconium metal alloy includes between 5% and 10% yttrium.

* * * * *